United States Patent [19]
Muto et al.

[11] 3,858,318
[45] Jan. 7, 1975

[54] PROCESS AND APPARATUS FOR POSITIONING AN ASSEMBLY OF INTERSECTING BEAM REINFORCING STRUCTURAL BARS WITH RESPECT TO PREVIOUSLY POSITIONED COLUMN REINFORCING STRUCTURAL BARS

[75] Inventors: Kiyoshi Muto, Tokyo; Yasuhisa Yamamoto, Kyoto; Yoshinori Toyoda; Shozo Azemi, both of Chiba; Shigeru Okano, Ichihara; Kenya Masuyama, Chiba; Seitaro Aihara, Tokyo; Takao Ito, Tokyo; Isamu Ogawa, Tokyo; Mitsumasa Harada, Tokyo, all of Japan

[73] Assignee: Kajima Kensitsa Kabushiki Kaisha, Tokyo, Japan

[22] Filed: Aug. 28, 1973

[21] Appl. No.: 392,374

[30] Foreign Application Priority Data
Mar. 16, 1973   Japan.............................. 48-30606

[52] U.S. Cl....................... 29/433, 29/464, 52/741, 52/745
[51] Int. Cl............................................. B23p 19/04
[58] Field of Search ............. 29/464, 433, 241, 465, 29/466, 467, 468, 469; 52/147, 301, 648, 653, 741, 745

[56] References Cited
UNITED STATES PATENTS

| | | | |
|---|---|---|---|
| 1,108,748 | 8/1914 | Hampton | 29/241 |
| 2,045,884 | 6/1936 | Sundback | 29/241 |
| 2,394,884 | 2/1946 | Adrias | 29/241 |
| 2,532,770 | 12/1950 | Huyett | 29/433 |
| 2,584,231 | 2/1952 | Schmidt | 29/241 |
| 2,591,925 | 4/1952 | Erbe | 29/241 |
| 2,691,817 | 10/1954 | Rainone et al. | 29/241 |
| 2,836,882 | 6/1958 | Nokes | 29/241 |
| 3,110,093 | 11/1963 | Johnson | 29/241 |
| 3,174,214 | 3/1965 | Davis | 29/241 |
| 3,555,674 | 1/1971 | Aileo et al. | 29/241 |

*Primary Examiner*—C. W. Lanham
*Assistant Examiner*—James R. Duzan
*Attorney, Agent, or Firm*—Sughrue, Rothwell, Mion, Zinn & Macpeak

[57] ABSTRACT

A process for positioning an assembly of intersecting beam reinforcing structural bars with respect to previously positioned column reinforcing structural bars in which the assembly of beam reinforcing structural bars is guided down onto the column reinforcing structural bars by means of pipe-like members temporarily attached either to the assembly of beam reinforcing structural bars or to the column reinforcing structural bars, after which the pipe-like members are removed.

20 Claims, 17 Drawing Figures

PROCESS AND APPARATUS FOR POSITIONING AN ASSEMBLY OF INTERSECTING BEAM REINFORCING STRUCTURAL BARS WITH RESPECT TO PREVIOUSLY POSITIONED COLUMN REINFORCING STRUCTURAL BARS

BACKGROUND OF THE INVENTION

1. Field of the Invention

The present invention relates to processes for positioning an assembly of beam reinforcing structural bars which intersect in at least two directions in one plane on the upper butt ends of previously positioned column reinforcing structural bars. These processes may be used in the construcion reinforcing structural bars. These processes may be used in the construction industry, in which such structural bars, normally made out of steel, are used to reinforce concrete columns and beams.

2. Description of the Prior Art

In the conventional process of positioning beam reinforcing structural bars with respect to previously positioned column reinforcing structural bars, the individual reinforcing structural bars are caused to intersect with one another at predetermined contact points on the column reinforcing structural bars and the beam reinforcing structural bars respectively. This process is obviously slow and laborious, and it also makes it difficult to effectuate proper arrangement of the reinforcing structural bars. Therefore, how to simplify the positioning of the reinforcing structural bars used to constitute a serious problem. Many attempts have been made thus far to work out an improved process therefor. However, none of such processes to date have obtained the purpose in an effective manner.

OBJECTS OF THE PRESENT INVENTION

With the foregoing defects of the prior art in mind, the principle objects of the present invention may be stated as follows:

1. to provide a process which enables beam reinforcing structural bars to be arranged on the upper butt end sections of column reinforcing structural bars in a simplified and smooth manner, thereby simplifying the positioning of reinforcing structural bars in the execution of construction work on job sites and enabling a great saving of man hours, and
2. to provide a process which enables assemblies of beam reinforcing structural bars to be simultaneously positioned with respect to previously positioned column reinforcing structural bars.

SUMMARY OF THE INVENTION

A process for positioning an assembly of intersecting beam reinforcing structural bars with respect to previously positioned column reinforcing structural bars in which the assembly of beam reinforcing structural bars is guided down onto the column reinforcing structural bars by means of pipe-like members temporarily attached either to the assembly of beam reinforcing structural bars or to the column reinforcing structural bars, after which the pipe-like members are removed.

DETAILED DESCRIPTION OF THE PREFERRED EMBODIMENTS

Basic Process

Figure 1:
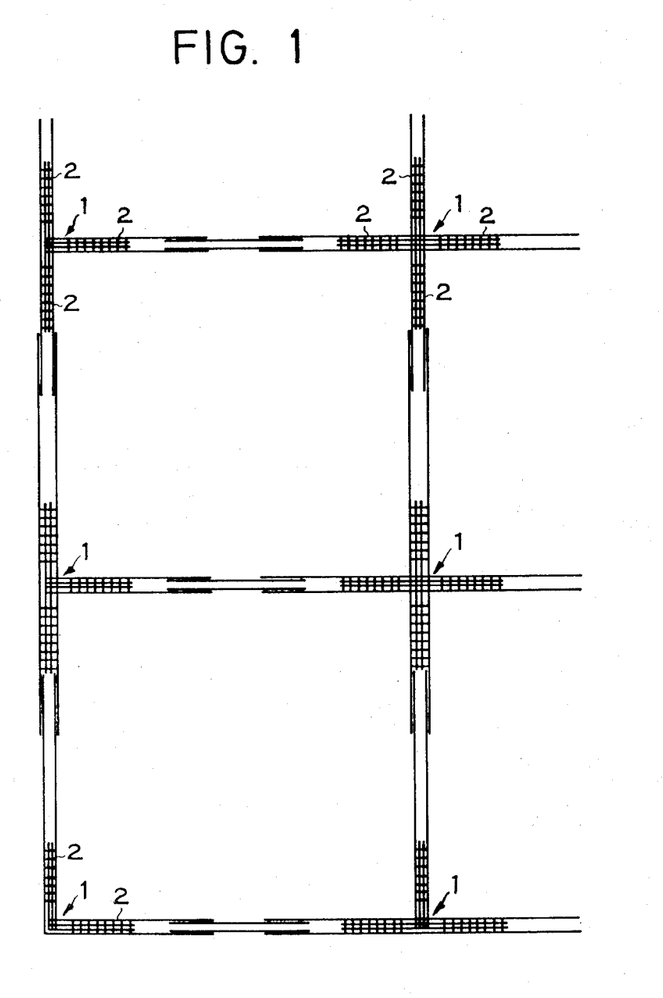
FIG. 1 is a plan view showing a number of assemblies of beam reinforcing structural bars joined together.
Figure 2:
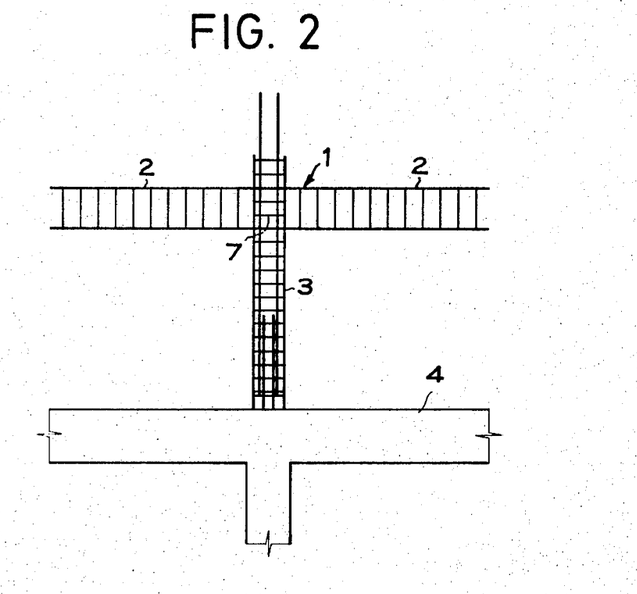
FIG. 2 is a front view showing one assembly of beam reinforcing structural bars positioned on previously positioned column reinforcing structural bars.
Figure 3:
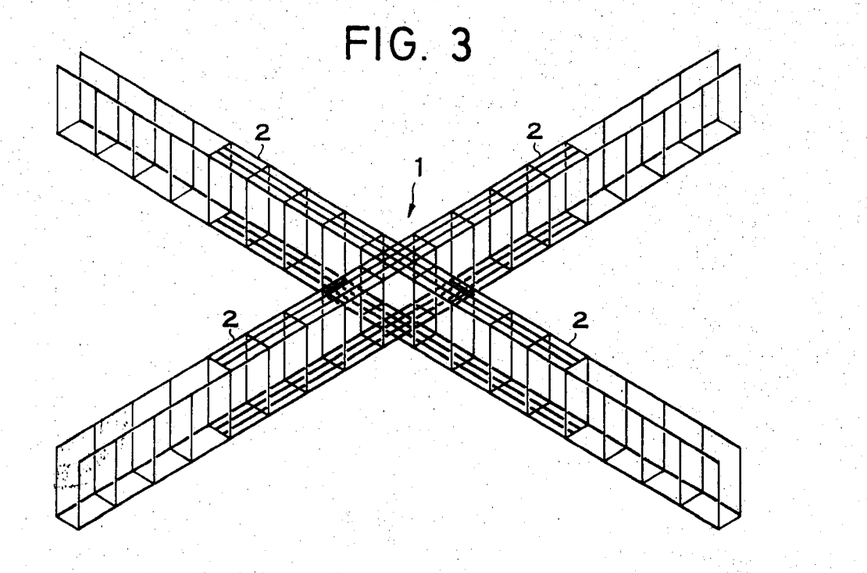
FIG. 3 is a perspective view of an assembly of beam reinforcing structural bars which may be employed in the process introduced by the present invention.

FIGS. 1 through 3 illustrate the structural members used in a basic process according to the present invention (FIGS. 2 and 3) and the finished assembly which it is desired to obtain (FIG. 1). In these figures one may see prefabricated assemblies 1 of beam reinforcing structural bars 2 and column reinforcing structural bars 3 positioned in a structural member 4 which would typically be the next lower module of the construction in which the process is being applied. While the beam reinforcing structural bars are shown in these figures as being joined perpendicularly, it should be understood that the present invention is equally applicable regardless of the angle at which they intersect. In FIG. 1 a number of prefabricated assemblies 1 of beam reinforcing structural bars 2 are shown as joined together at the projecting ends thereof. The length of each beam reinforcing bar 2 is set to be in conformity with the length of the span of the beam down to the minimum point of the bending moment thereof, or to be in conformity with the length of the span of the beam to an intermediate section of such a value as is approximate thereto.

Figure 4:
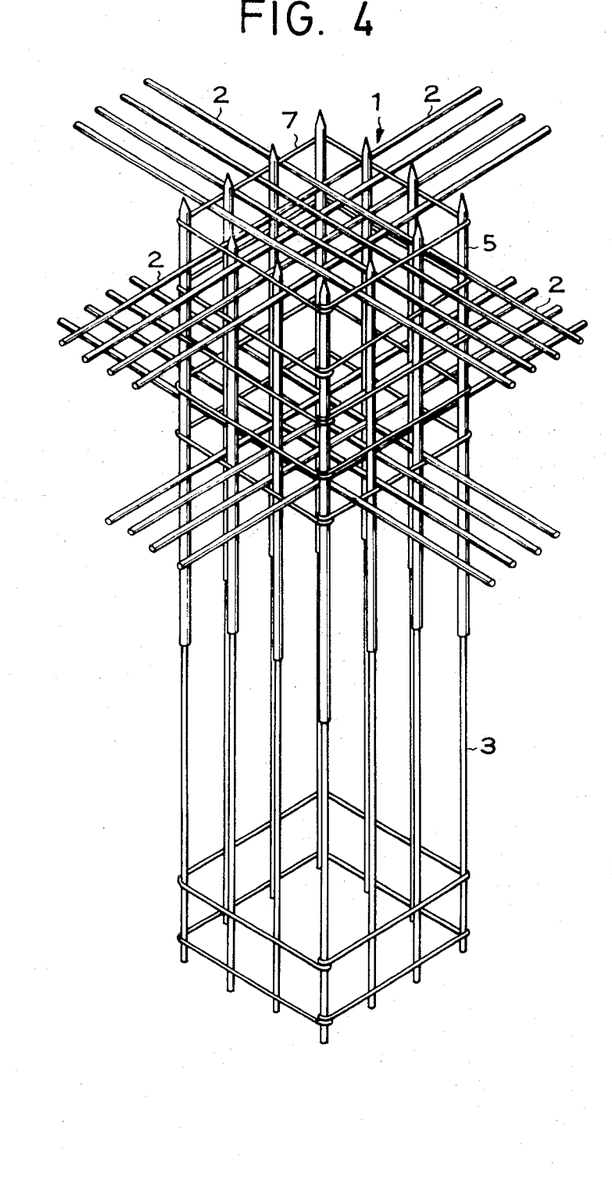
FIG. 4 is a perspective view showing an assembly of beam reinforcing structural bars being guided into place on previously positioned column reinforcing structural bars by application of the process introduced by the present invention.

FIG. 4 is a perspective view taken in the middle of the execution of the basic process according to the present invention and will be best understood in connection with the explanation of FIGS. 6 – 9, which illustrate the process in stepwise fashion.

Figure 5:
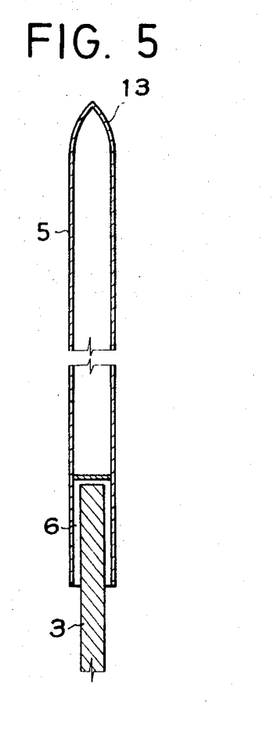
FIG. 5 is a view in longitudinal section of a guide pipe which may be employed in the process introduced by the present invention.

FIG. 5 shows a preferred form of the guidepipe 5 use of which is central to the process of the present invention in its basic form. As may be seen, it is generally pipe-like in shape, has an upper butt end 13 which is formed into an apex, and has a lower butt end 6 which is concave and adapted to receive a column reinforcing structural bar 3.

FIGS. 6 – 9 illustrate the basic process of the present invention in stepwise fashion.

Figure 6:
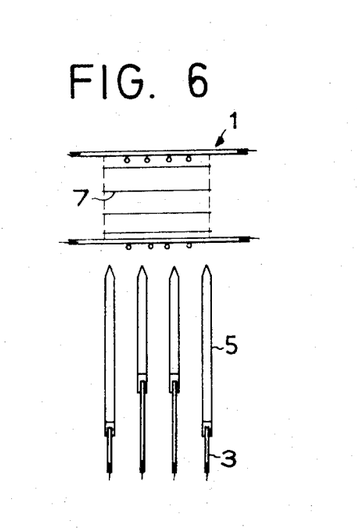
FIGS. 6 through 9 are views in partial section illustrating the steps of a basic process according to the present invention.

In FIG. 6, the guidepipes 5 are shown in temporary position over the tops of the column reinforcing structural bars 3 on which it is desired to position the assembly 1. (Guidepipes 5 are shown in temporary position on all the column reinforcing structural bars 3, which is preferred, but of course the guidepipes may be left off of some of the column reinforcing structural bars 3 without making the positioning process unworkable.) The designators 7 refer to reinforcing hoops which are used initially to reinforce the assembly 1 at the region of intersection of the beam reinforcing structural bars 2 and which are subsequently used, as will be explained hereinafter, in attaching the assembly 1 to column reinforcing structural bars 3.

Figure 7:
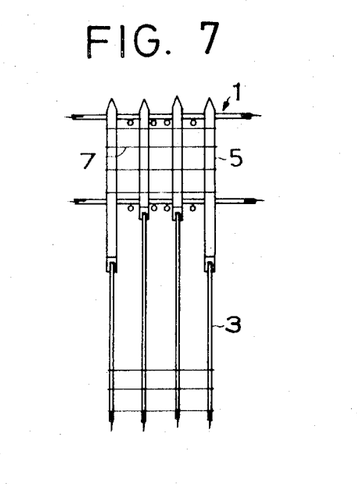

In FIG. 7, the assembly 1 is shown being guided down over the guidepipes 5, the apices of the guidepipes 5 serving to compensate for the inevitable small misalignments in the position of the assembly 1 as it is lowered (as by a crane) towards the upwardly projecting column reinforcing structural bars 3.

Figure 8:
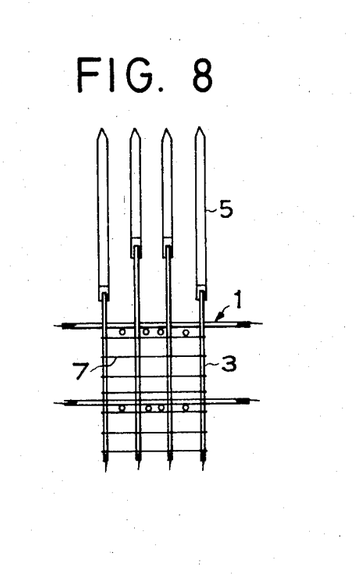

FIG. 8 shows the assembly 1 as having passed down over the guidepipes 5 towards, or to, its intended final position with respect thereto.

Figure 9:
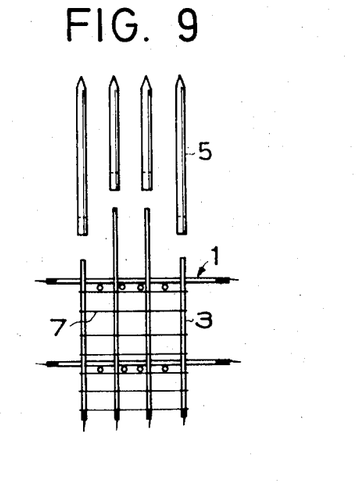

Finally, FIG. 9 shows the guidepipes 5, which are reusable, being removed from the tops of the column reinforcing structural bars 3. At the same time, preferably, the reinforcing hoops 7 may be used to attach the assembly 1 to the column reinforcing structural bars 3. Alternatively, the assembly 1 may be attached to the column reinforcing structural bars 3 by any other suitable means, or the reinforcing hoops 7 may be used to attach the assembly 1 to the column reinforcing structural bars 3 after the guidepipes 5 have been removed therefrom.

Modified Process

FIGS. 10–17 illustrate a modification of the basic process previously described. The principal difference between this process and the basic process is that sleevepipes 11 temporarily attached to the assembly 8 replace the guidepipes 5 temporarily attached to the column reinforcing structural bars 3. Because of their different use, the sleevepipes 11 need not have apices on their upper butt ends, as do the guidepipes 5. With this difference in mind, the description of the modified process will be limited to those aspects thereof which differ from the basic process.

Figure 10:
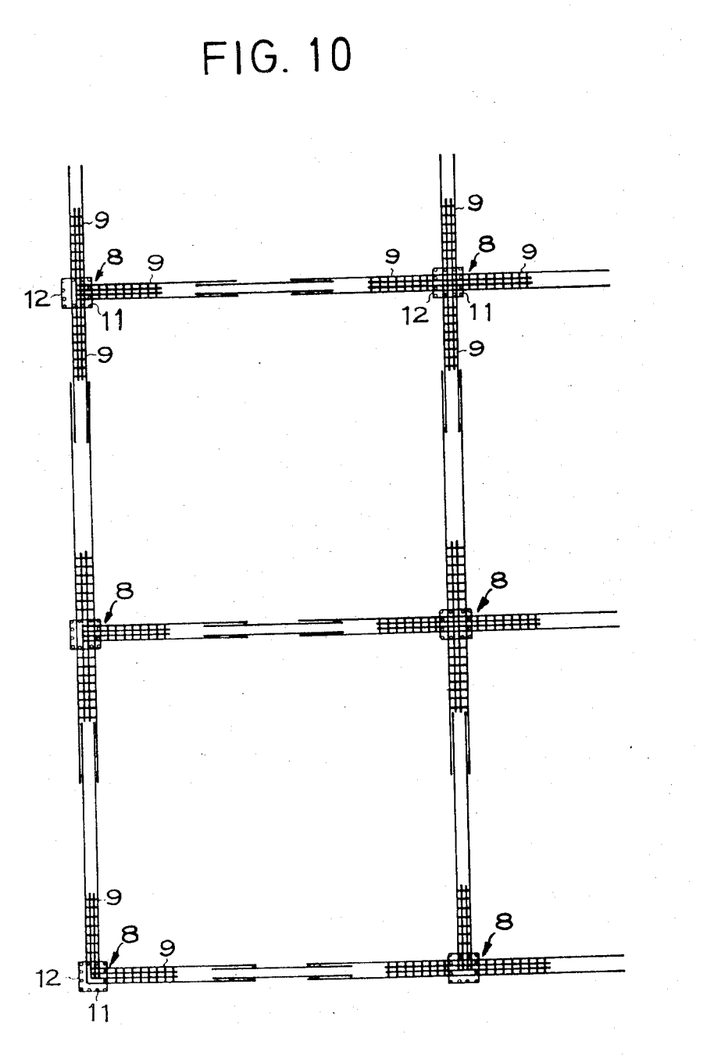
FIG. 10 is a plan view of a number of assemblies of beam reinforcing structural bars positioned by a modification of the process illustrated by FIGS. 6-9.
Figure 11:
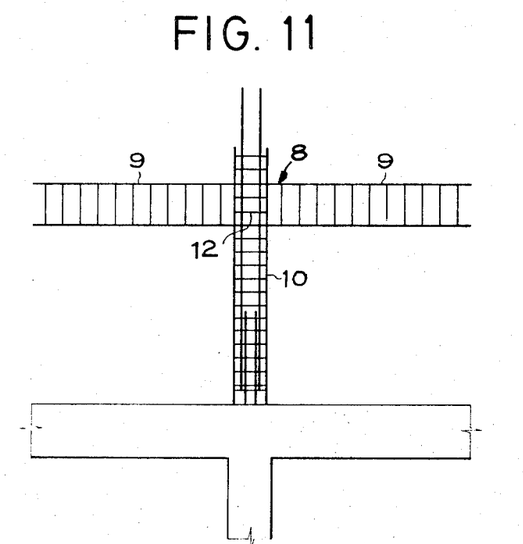
FIG. 11 is a front view showing one assembly of beam reinforcing structural bars positioned on column reinforcing structural bars by the modified process.
Figure 12:
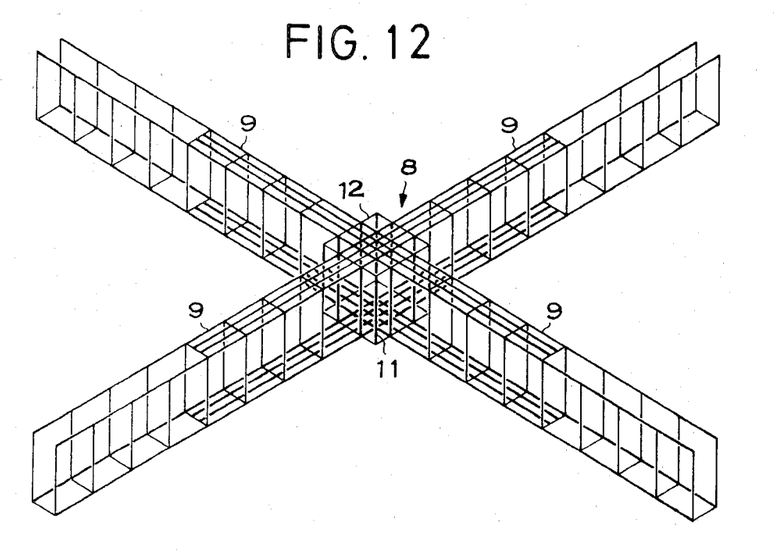
FIG. 12 is a perspective view of an assembly of beam reinforcing structural bars which may be employed with the modified process.
Figure 13:
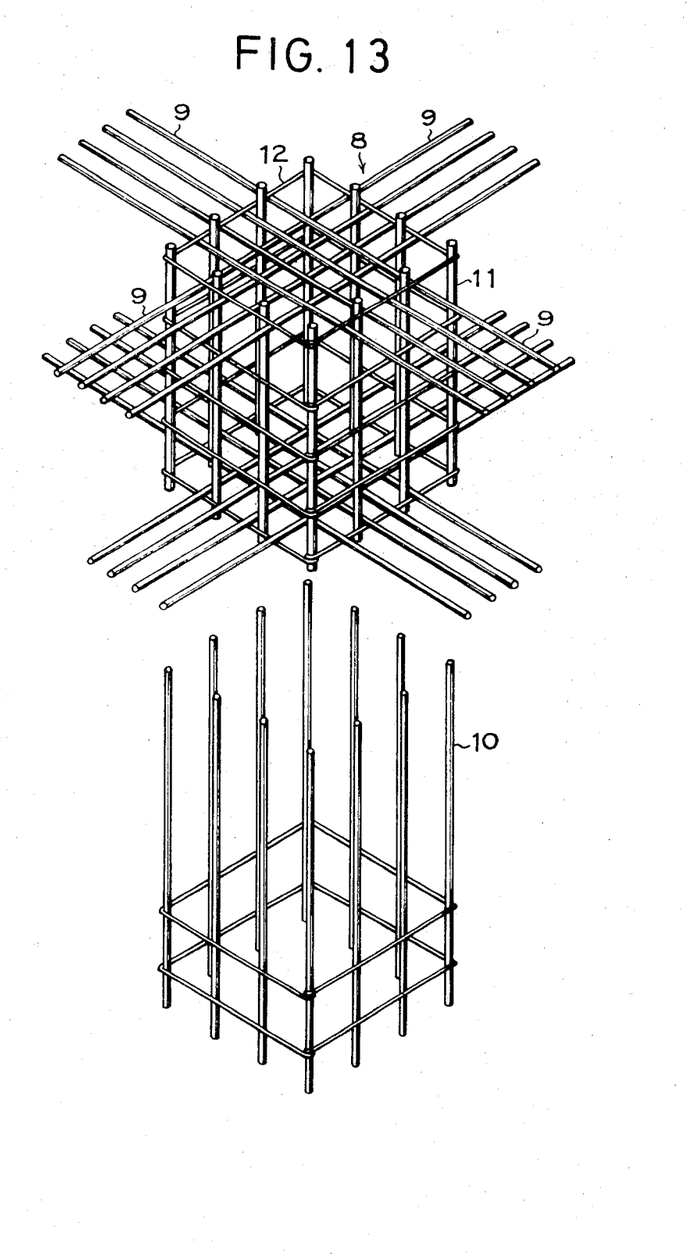
FIG. 13 is a partial perspective view showing an assembly of beam reinforcing structural bars being guided into place on previously positioned column reinforcing structural bars by the modified process.
Figure 14:
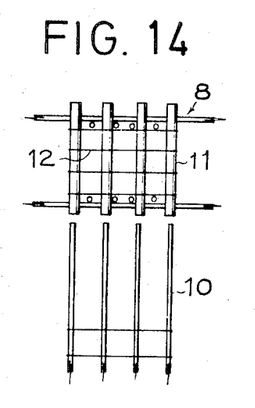
FIGS. 14-17 are views in partial section illustrating the steps of the modified process.
Figure 15:
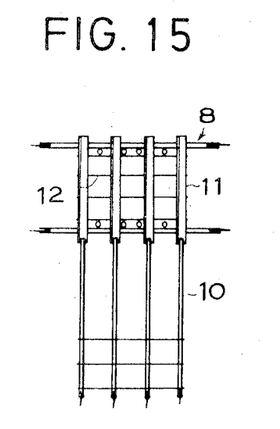
Figure 16:
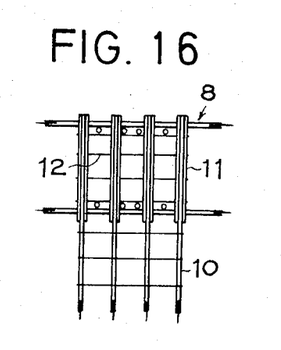
Figure 17:
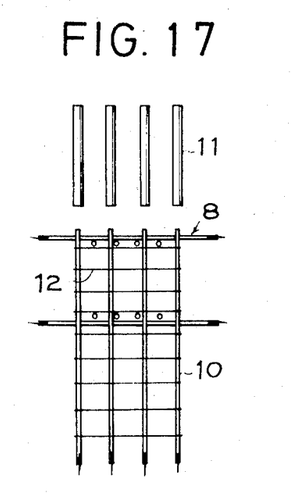

FIGS. 10 – 12 correspond generally to FIGS. 1 – 3, with the designators 8 being applied to assemblies of beam reinforcing structural bars 9, 10 to the column reinforcing structural bars, 11 to the sleevepipes, and 12 to the reinforcing hoops. The sleevepipes 11 are not individually illustrated, but they may be clearly seen (particularly in FIG. 13) to be generally pipelike in shape and to have lower butt ends which are concave in shape and adapted to receive column reinforcing structural bars. The shape of the upper butt end, however, is arbitrary, and in fact the sleevepipes 11 may be simply pipes of appropriate inner diameter, hollow throughout their length. FIG. 13 shows a plurality of sleevepipes 11 (the number of which again is preferably, but not necessarily, equal to the number of reinforcing structural bars 10) temporarily fixed in position to the assembly 8 around the intersection of the beam reinforcing structural bars 9 with their lower butt ends down and in positions corresponding to the locations which corresponding column reinforcing structural bars 10 will occupy when the process is completed.

FIGS. 14 – 17 correspond generally to FIGS. 6 – 9, similarly illustrating a process of guiding the assembly 8 down onto the column reinforcing structural bars 10 by means of the slip-fit of male members (in this case the column reinforcing structural bars 10) and female members (in this case the sleevepipes 11). Again, the reinforcing hoops 12 are preferably used to attach the assembly 8 to the column reinforcing structural bars 10 as the sleevepipes 11 are being removed, but again, the assembly 8 may be attached to the column reinforcing structural bars 10 by any other suitable means, or the reinforcing hoops 12 may be used to attach the assembly 8 to the column reinforcing structural bars 10 after the sleevepipes 11 have been removed from the assembly 8.

CAVEAT

While the present invention has been illustrated by detailed descriptions of two preferred processes according thereto and of a sleevepipe particularly adapted to be used therewith, it will be obvious to those skilled in the art that various modifications in form and detail may be made to the illustrated processes and sleevepipe without departing from the true scope of the present invention. Accordingly, the scope of the present invention must be measured by the claims attached hereto and not solely by the foregoing detailed descriptions of preferred embodiments thereof.

What is claimed is:

1. A process for attaching an assembly of intersecting beam reinforcing structural bars to previously positioned column reinforcing structural bars at a previously determined position thereon comprising the steps of:
   1. placing guidepipes which
      a. are generally pipe-like in shape,
      b. have upper butt ends which are formed into an apex, and
      c. have lower butt ends which are concave and adapted to receive column reinforcing structural bars therein over at least some of the previously positioned column reinforcing structural bars, the lower but end of each guidepipe receiving the upper end of each column reinforcing structural bar;
   2. guiding said assembly of beam reinforcing structural bars down over said guidepipes; and
   3. removing said guidepipes from the tops of said column reinforcing structural bars.

2. A process as claimed in claim 1 and further comprising the step of encompassing said column reinforcing structural bars with reinforcing hoops positioned immediately above and immediately below said assembly of beam reinforcing structural bars.

3. A process as claimed in claim 2 wherein the step of encompassing said column reinforcing structural bars with reinforcing hoops is effected after said guidepipes have been removed from the tops of said column reinforcing structural bars.

4. A process as claimed in claim 2 wherein the step of encompassing said column reinforcing structural bars with reinforcing hoops is effected concurrently with the step of removing guidepipes from the tops of said column reinforcing structural bars.

5. A process for attaching an assembly of intersecting reinforcing structural bars to previously positioned column reinforcing structural bars at a previously determined position thereon comprising the steps of:
1. placing sleevepipes which
   a. are generally pipe-like in shape and
   b. have lower butt ends which are adapted to receive column reinforcing structural bars therein around the intersection of said beam reinforcing structural bars with their lower butt ends down and in positions corresponding to the locations which at least some of said column reinforcing structural bars will occupy when the process is completed;
2. temporarily fixing said sleevepipes to said assembly of beam reinforcing structural bars in the above positions;
3. guiding said assembly of beam reinforcing structural bars down over said column reinforcing structural bars with the lower butt end of each sleevepipe receiving the upper end of the corresponding column reinforcing structural bar; and
4. removing said sleevepipes from the tops of said column reinforcing structural bars.

6. A process as claimed in claim 5 and further comprising the step of encompassing said column reinforcing structural bars with reinforcing hoops positioned immediately above and immediately below said assembly of beam reinforcing structural bars.

7. A process as claimed in claim 6 wherein the step of encompassing said column reinforcing structural bars with reinforcing hoops is effected after said guidepipes have been removed from the tops of said column reinforcing structural bars.

8. A process as claimed in claim 6 wherein the step of encompassing said column reinforcing structural bars with reinforcing hoops is effected concurrently with the step of removing said sleevepipes from the tops of said column reinforcing structural bars.

9. A process as claimed in claim 5 wherein said sleevepipes are temporarily fixed to said assembly of beam reinforcing structural bars by means of reinforcing hoops encompassing said sleevepipes immediately above and immediately below said assembly of beam reinforcing structural bars.

10. A process as claimed in claim 9 and further comprising the step of attaching said reinforcing hoops to said column reinforcing structural bars as said sleevepipes are removed from the tops of said column reinforcing structural bars.

11. A process for positioning an assembly of intersecting beam reinforcing structural bars with respect to previously positioned column reinforcing structural bars comprising the steps of:
1. placing guidepipes which
   a. are generally pipe-like in shape,
   b. have upper butt ends which are formed into an apex, and
   c. have lower butt ends which are concave and adapted to receive column reinforcing structural bars therein over at least some of the previously positioned column reinforcing structural bars, the lower butt end of each guidepipe receiving the upper end of each column reinforcing structural bar;
2. guiding said assembly of beam reinforcing structural bars down over said guidepipes;
3. removing said guidepipes from the tops of said column reinforcing structural bars; and
4. attaching said assembly of beam reinforcing structural bars to said previously positioned column reinforcing structural bars at a previously determined position thereon.

12. A process claimed in claim 11 and further comprising the step of encompassing said column reinforcing structural bars with reinforcing hoops positioned immediately above and immediately below said assembly of beam reinforcing structural bars.

13. A process as claimed in claim 12 wherein the step of encompassing said column reinforcing structural bars with reinforcing hoops is effected after said guidepipes have been removed from the tops of said column reinforcing structural bars.

14. A process as claimed in claim 12 wherein the step of encompassing said column reinforcing structural bars with reinforcing hoops is effected concurrently with the step of removing said guidepipes from the tops of said column reinforcing structural bars.

15. A process for positioning an assembly of intersecting reinforcing structural bars with respect to previously positioned column reinforcing structural bars comprising the steps of:
1. placing sleevepipes which
   a. are generally pipe-like in shape and
   b. have lower butt ends which are adpated to receive column reinforcing structural bars therein around the intersection of said beam reinforcing structural bars with their lower butt ends down and in positions corresponding to the locations which at least some of said column reinforcing structural bars will occupy when the process is completed;
2. temporarily fixing said sleevepipes to said assembly of beam reinforcing structural bars in the above positions;
3. guiding said assembly of beam reinforcing structural bars down over said column reinforcing structural bars with the lower butt end of each sleevepipe receiving the upper end of the corresponding column reinforcing structural bar;
4. removing said sleevepipes from the tops of said column reinforcing structural bars; and
5. attaching said assembly of beam reinforcing structural bars to said previously positioned column reinforcing structural bars at a previously determined position thereon.

16. A process as claimed in claim 15 and further comprising the step of encompassing said column reinforcing structural bars with reinforcing hoops positioned immediately above and immediately below said assembly of beam reinforcing structural bars.

17. A process as claimed in claim 16 wherein the step of encompassing said column reinforcing structural bars with reinforcing hoops is effected after said guidepipes have been removed from the tops of said column reinforcing structural bars.

18. A process as claimed in claim 16 wherein the step of encompassing said column reinforcing structural bars with reinforcing hoops is effected concurrently with the step of removing said sleevepipes from the tops of said column reinforcing structural bars.

19. A process as claimed in claim 15 wherein said sleevepipes are temporarily fixed to said assembly of beam reinforcing structural bars by means of reinforcing hoops encompassing said sleevepipes immediately above and immediately below said assembly of beam reinforcing structural bars.

20. A process as claimed in claim 19 and further comprising the step of attaching said reinforcing hoops to said column reinforcing structural bars as said sleevepipes are removed from the tops of said column reinforcing structural bars.

* * * * *